Nov. 28, 1967  F. K. LAKE  3,354,823
INK FOUNTAIN FOR DISPENSING PACKAGED INK
Filed Jan. 28, 1965  10 Sheets-Sheet 1
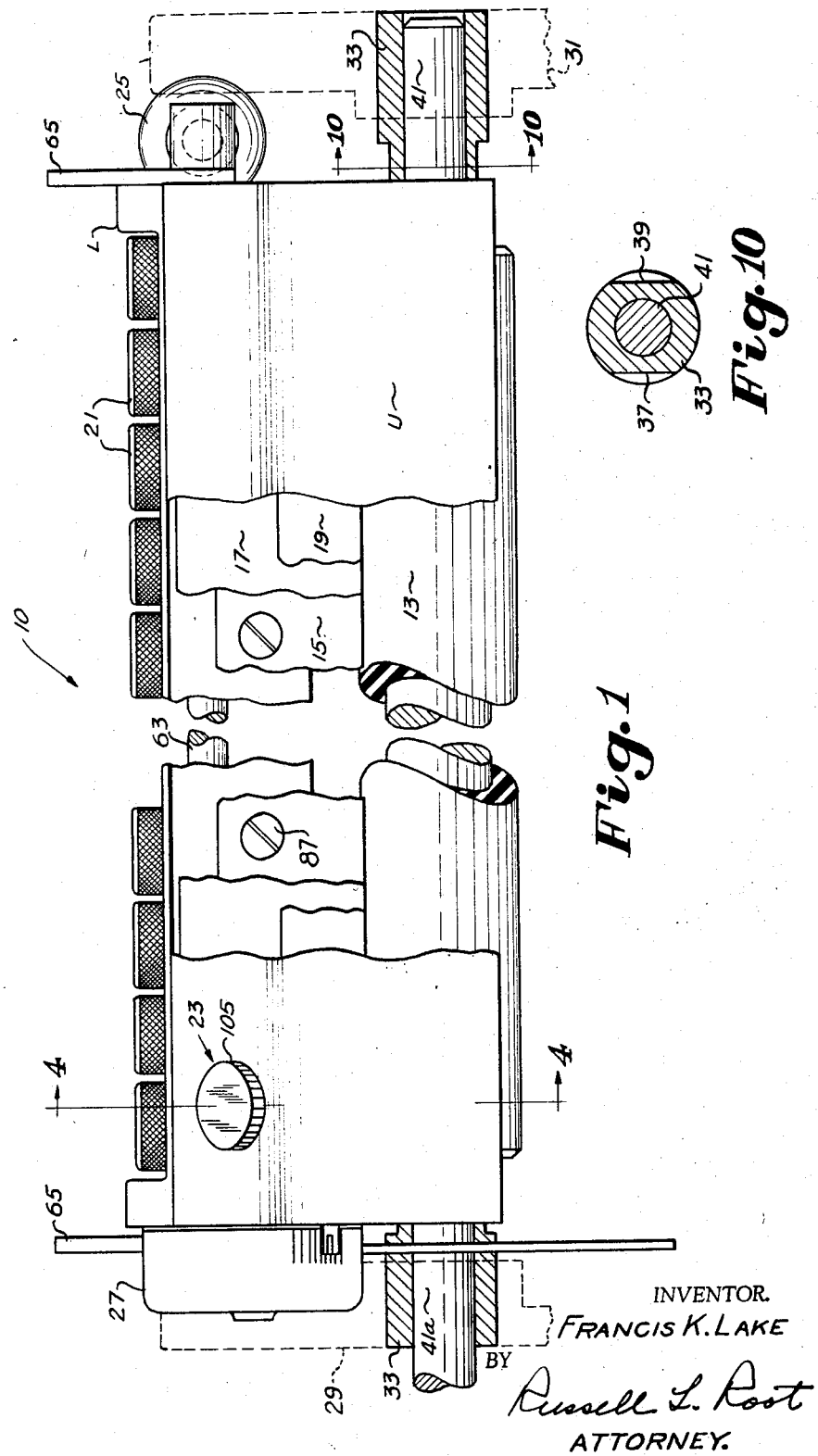
INVENTOR.
FRANCIS K. LAKE
BY Russell L. Root
ATTORNEY.

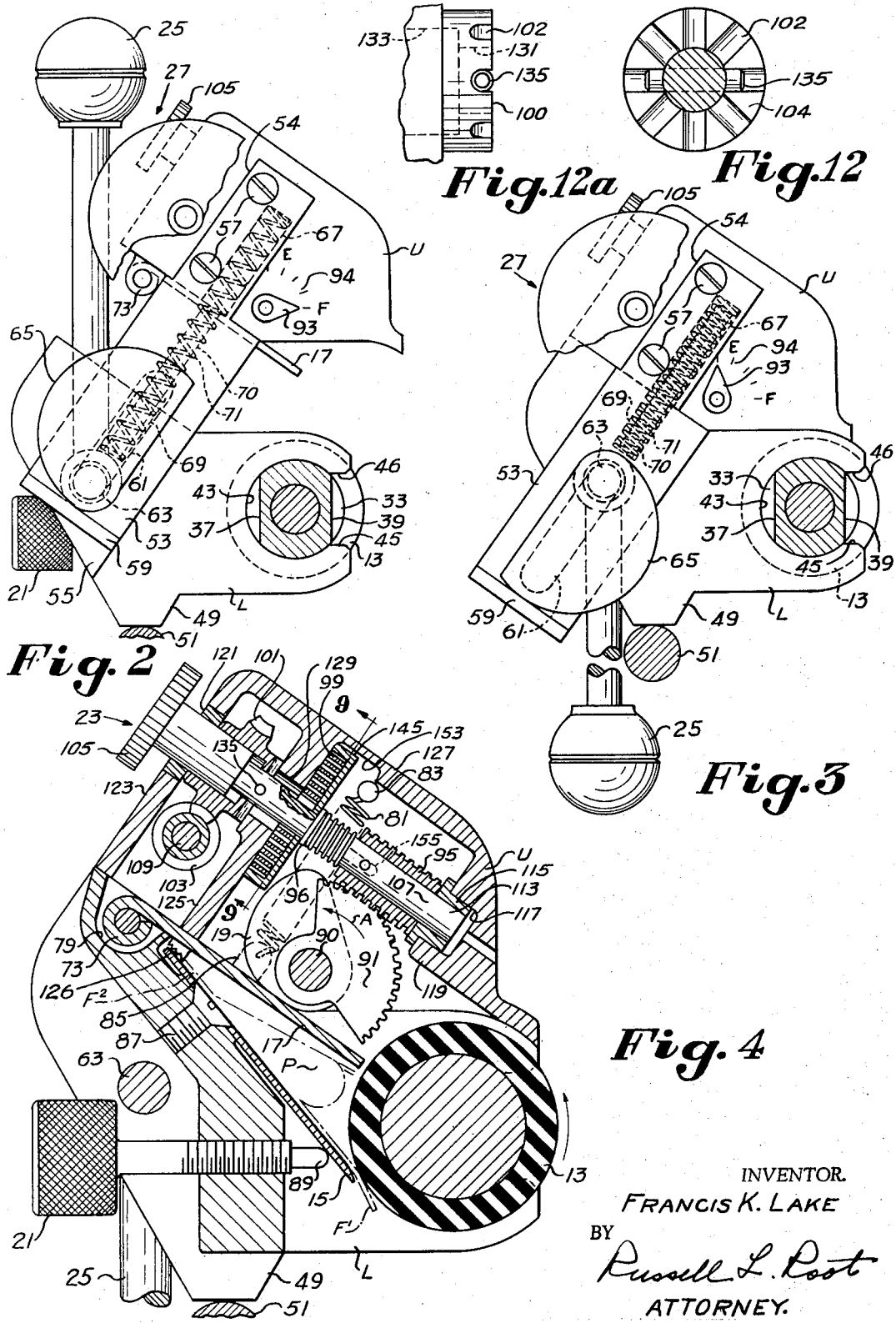

Nov. 28, 1967  F. K. LAKE  3,354,823
INK FOUNTAIN FOR DISPENSING PACKAGED INK
Filed Jan. 28, 1965  10 Sheets-Sheet 3

INVENTOR.
FRANCIS K. LAKE
BY
Russell L. Root
ATTORNEY.

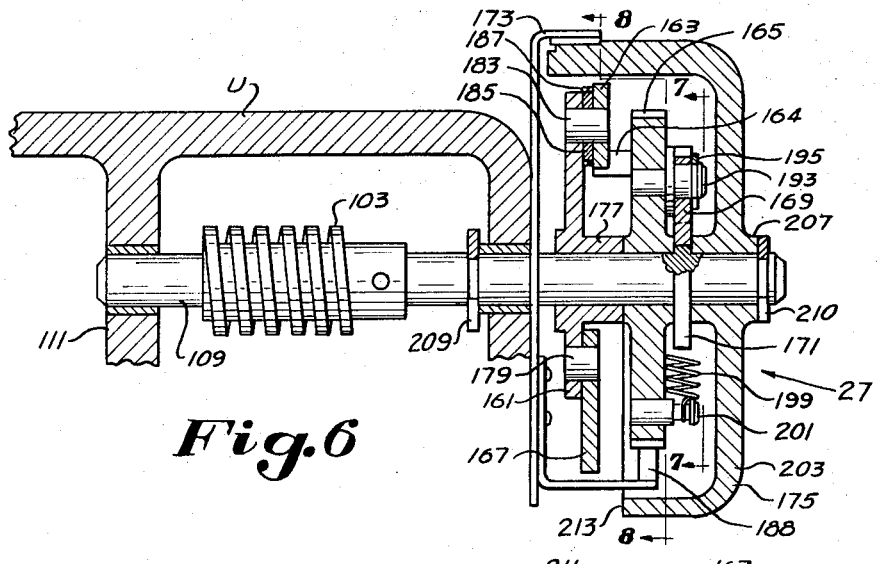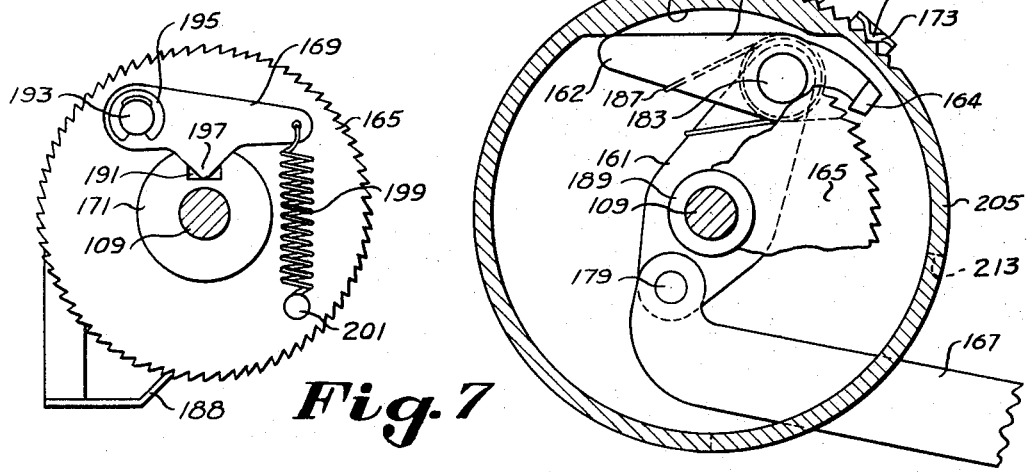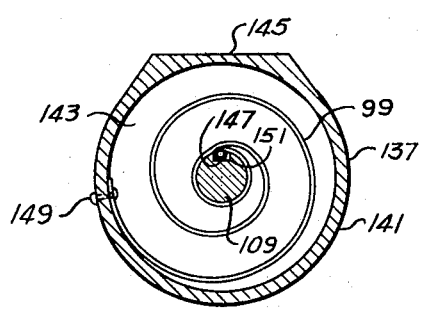

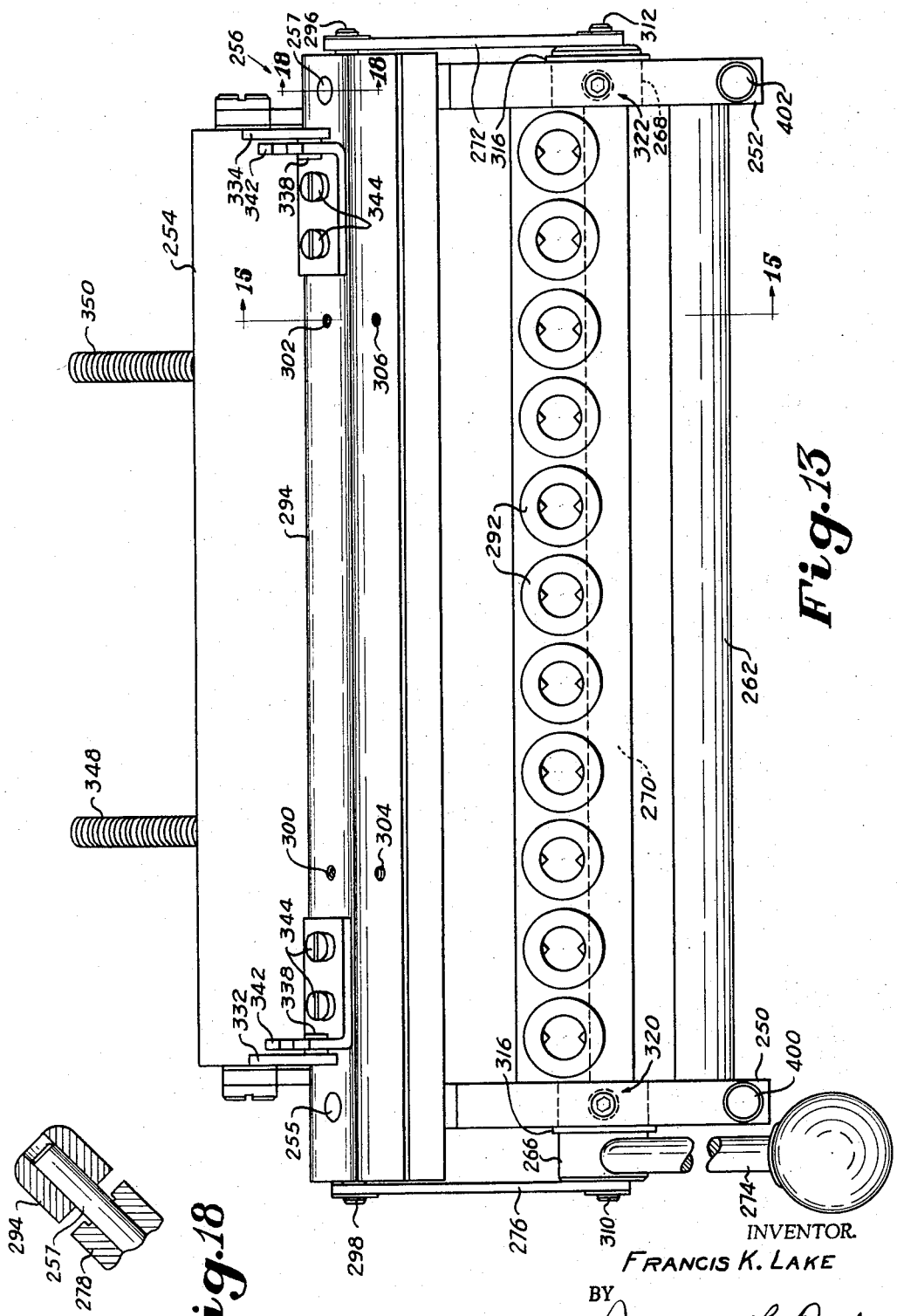

Nov. 28, 1967   F. K. LAKE   3,354,823
INK FOUNTAIN FOR DISPENSING PACKAGED INK
Filed Jan. 28, 1965   10 Sheets-Sheet 6
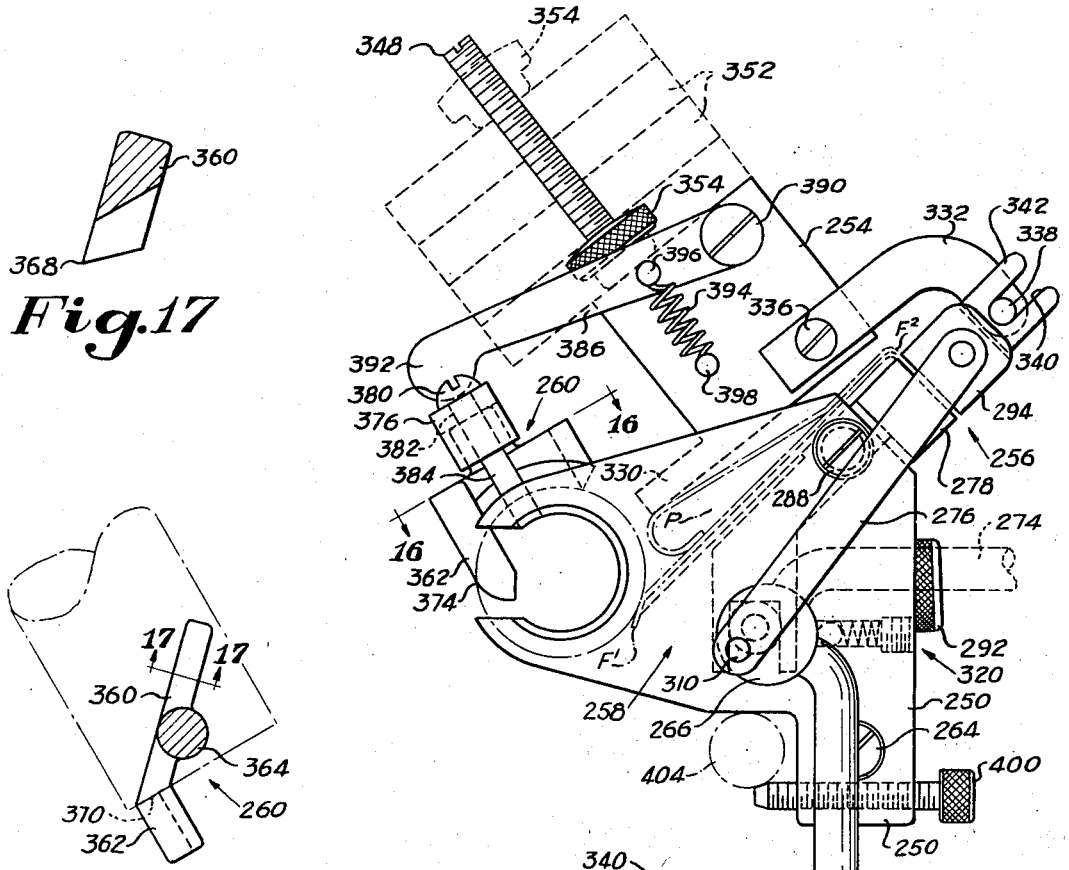
INVENTOR.
FRANCIS K. LAKE
BY
ATTORNEY.

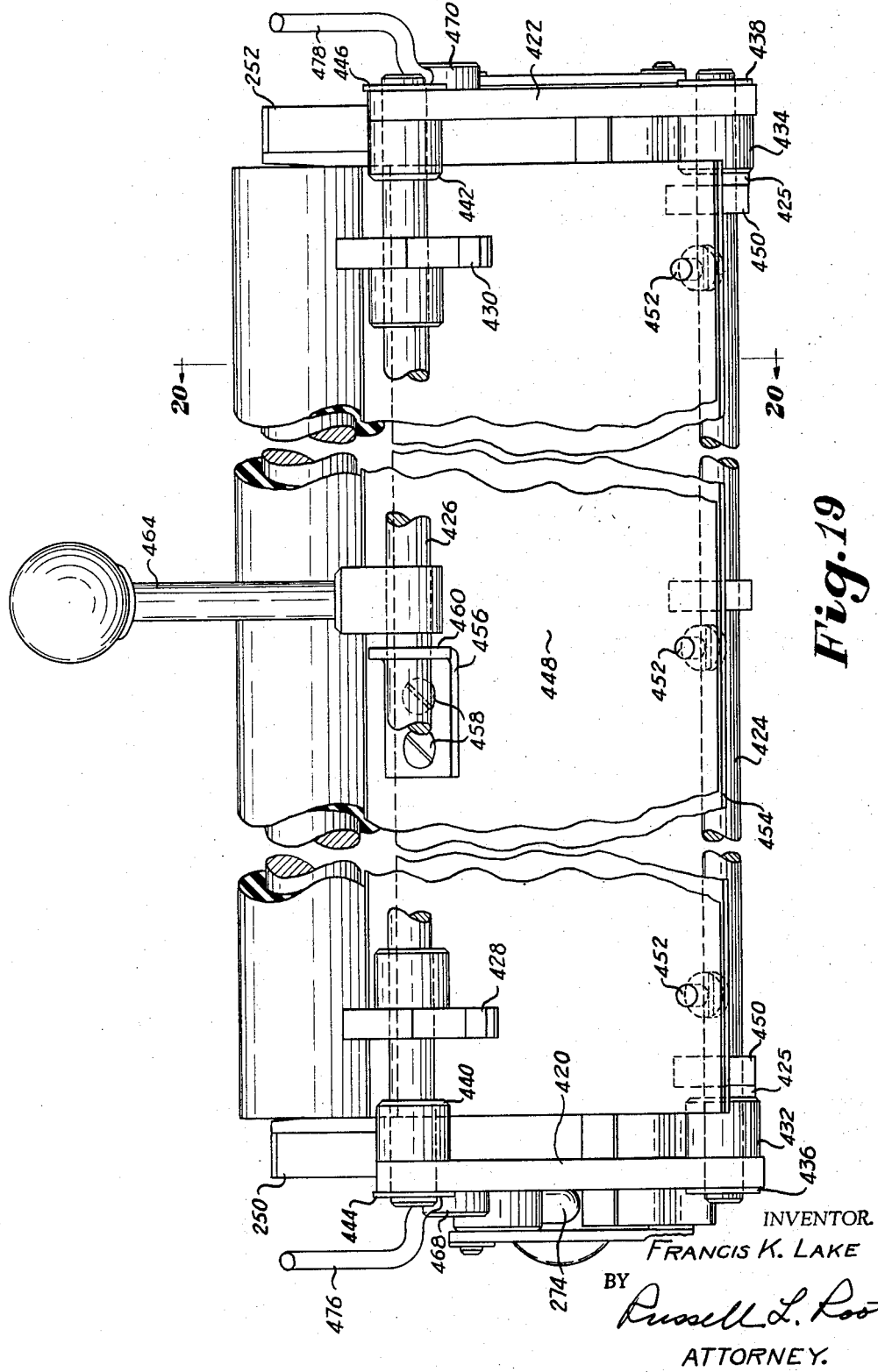

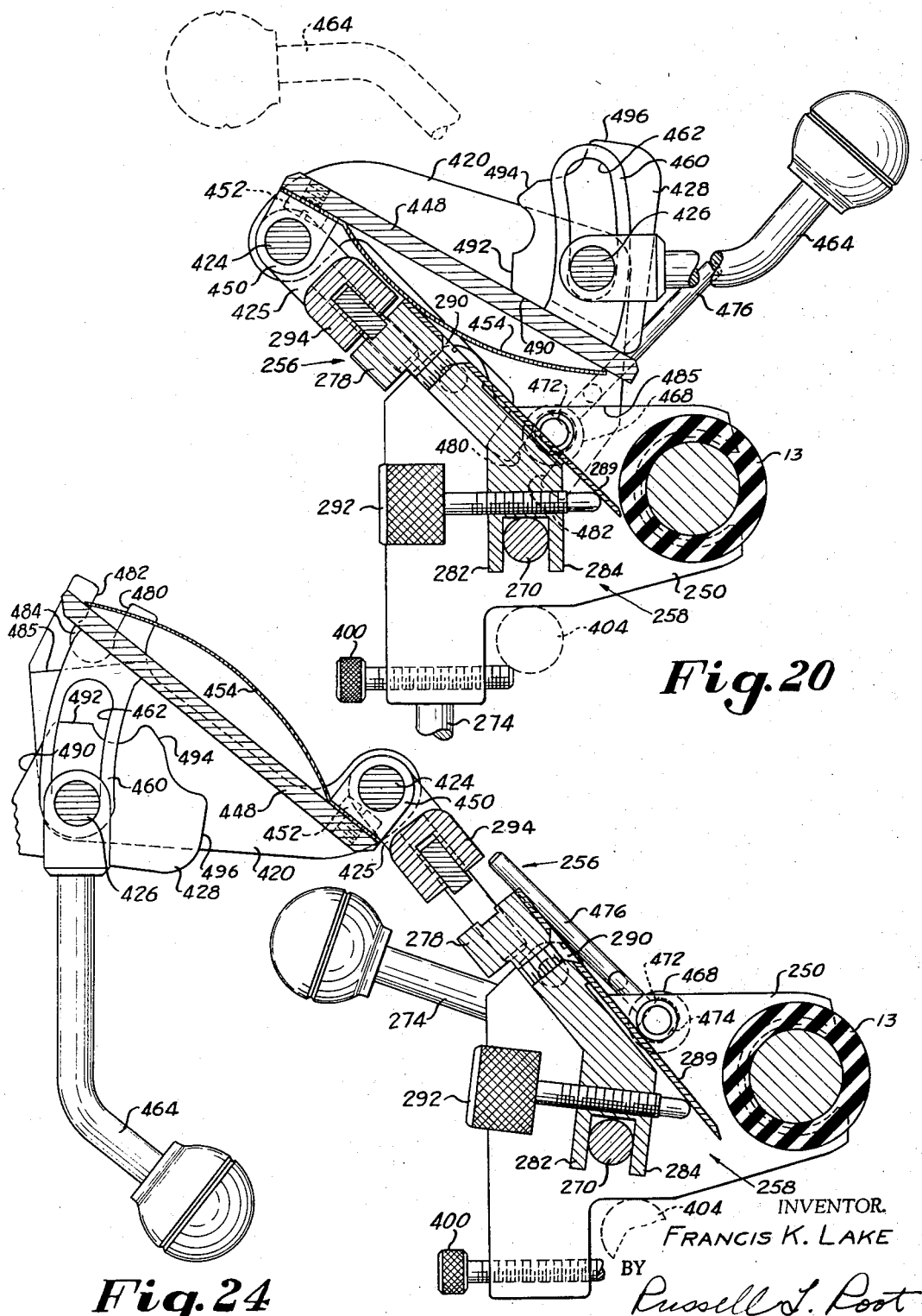

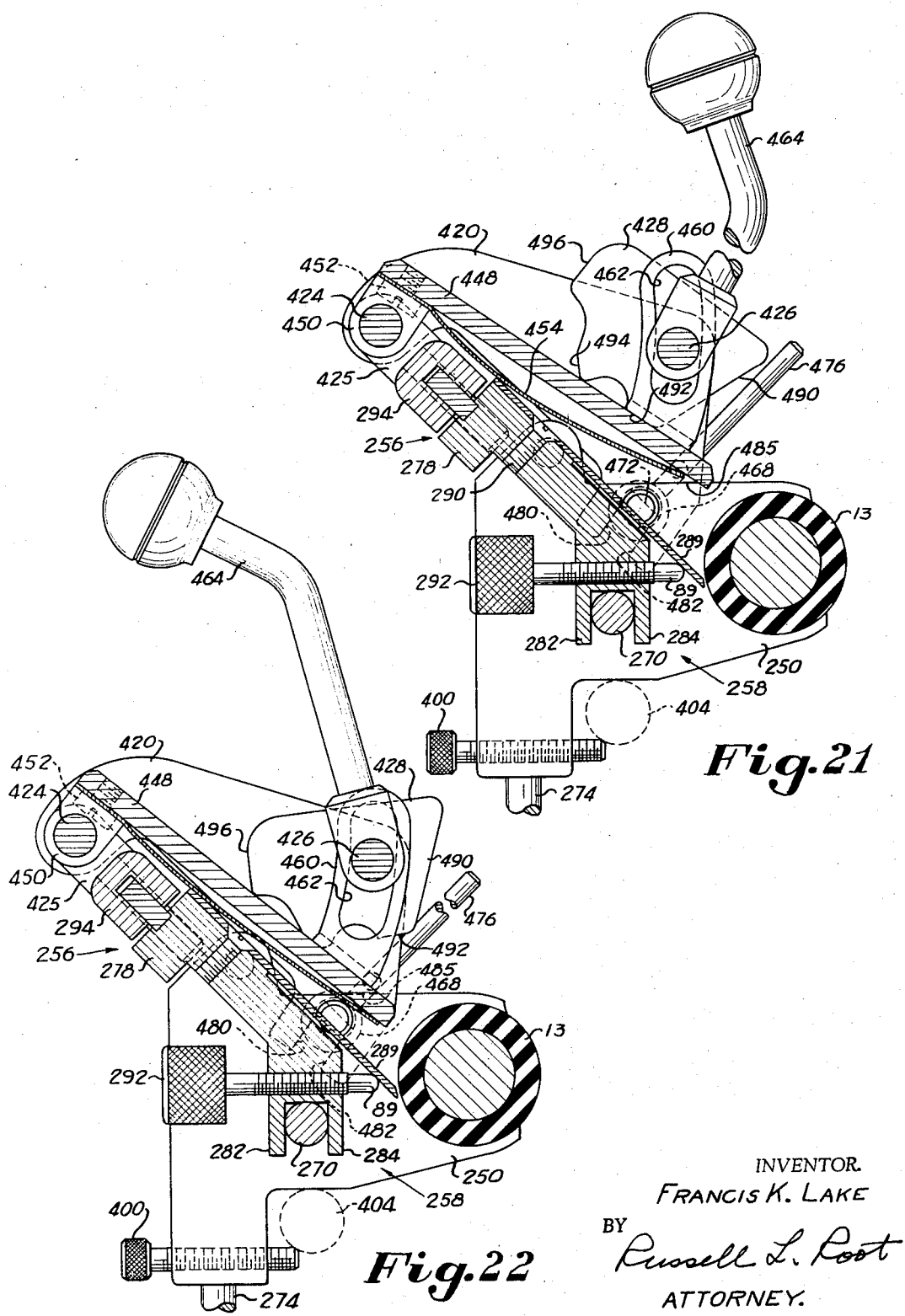

United States Patent Office 3,354,823
Patented Nov. 28, 1967

3,354,823
INK FOUNTAIN FOR DISPENSING PACKAGED INK
Francis K. Lake, Euclid, Ohio, assignor to Addressograph-Multigraph Corporation, Cleveland, Ohio, a corporation of Delaware
Filed Jan. 28, 1965, Ser. No. 428,775
18 Claims. (Cl. 101—350)

The present invention relates to an ink fountain for a printing press or duplicating machine and, more particularly, to an ink fountain for use with packaged ink whereby the package is placed into the fountain and the ink is dispensed from the package directly to the ink fountain roller.

Among the wide variety of ink fountains on duplicating machines in use today, it is customary practice to supply or replenish the ink in the fountain as by transferring the ink from a can, tube, or the like to the ink fountain of the machine. This manner of transferring the ink from the container to the fountain is, of course, effected manually and, therefore, often times results in the operator's having ink-soiled fingers and clothing.

Another method of supplying ink to the ink fountain utilizes an ink reservoir from which the ink is fed to the fountain. Although this method might have some advantages over the practice mentioned above, it requires rather elaborate and expensive equipment to pump or feed the ink from the reservoir and to control the ink feed in properly metered amounts.

Also, both of the foregoing arrangements for supplying ink to an ink fountain of a duplicating machine require that the ink be placed directly in the ink fountain and fed therefrom to the fountain roller. Accordingly, the fountain becomes contaminated with ink resulting in a time consuming and messy cleanup operation. Additionally, because the ink in the fountain is exposed to the atmosphere, it is subject to skinning, and is exposed to dust, dirt, lint and other foreign matter in the air which settles on the ink. As will be appreciated, this foreign matter in the fountain is likely to be passed through the ink train and onto the printing plate and often creates problems in attempting to obtain high quality duplicated copies.

It is an object of the present invention to provide an ink fountain for a duplicating machine or the like which overcomes the disadvantages associated with present day inking arrangements as mentioned above.

Another object of the invention is to provide an ink fountain which is easily supplied with ink with a minimum of danger to the machine operator of ink-soiled fingers and clothing.

Another object of the invention is to provide an ink fountain which can be readily adjusted to effect proper control of the ink feed and, once adjusted, maintains accurate control of the ink feed during machine operation.

Another object of the invention is to provide an ink fountain adapted to receive a package of ink and to dispense the ink directly from the package to the ink fountain roller. Such an arrangement has the advantages of protecting the fountain and adjacent parts from coming into contact with the ink, thereby greatly reducing the time required and messy operation associated with cleaning conventional type ink fountains. Further, since the fountain of the present invention accepts ink in a packaged condition, the ink in the fountain is not exposed to the atmosphere and, therefore, is protected against skinning and from foreign particles in the air which might accumulate in the ink fountain. This results in a highly improved capability for the production of high quality duplicated copies.

A feature of the present invention is the provision of an ink fountain which accepts ink in a package or envelope, and which includes means to dispense the ink directly from the envelope to the ink fountain roller in properly measured amounts, thereby greatly facilitating clean up of the fountain as well as permitting clean hand operation when supplying or replenishing the ink in the fountain.

These and other objects, features and advantages of the invention will become more apparent from the following description and drawings wherein:

FIG. 1 is a condensed plan view, with parts broken away, of the ink fountain of the present invention;

FIG. 2 is a left hand end elevation showing the fountain in an open position to receive or permit removal of an ink package, parts being shown broken away and other parts in section;

FIG. 3 is an end elevation similar to FIG. 2 showing the fountain after the ink has been dispensed from the package but before the package is removed;

FIG. 4 is a section on line 4—4 of FIG. 1;

FIG. 6 is an enlarged section taken substantially on line 6—6 of FIG. 5;

FIG. 7 is a detail section on line 7—7 of FIG. 6, but showing the parts in a different orientation;

FIG. 8 is a section on line 8—8 of FIG. 6;

FIG. 9 is a section on line 9—9 of FIG. 4;

FIG. 10 is a section on line 10—10 of FIG. 1;

FIG. 12 is a section on line 12—12 of FIG. 11;

FIG. 12a is a side view of the apparatus shown in FIG. 12;

FIG. 13 is a front elevation of an alternate form of ink fountain;

FIG. 14 is a left hand end elevation of the ink fountain of FIG. 13;

FIG. 15 is a section on line 15—15 of FIG. 13 with parts removed;

FIG. 16 is a section on line 16—16 of FIG. 14;

FIG. 17 is a section on line 17—17 of FIG. 16;

FIG. 18 is a section on line 18—18 of FIG. 13;

FIG. 19 is a condensed plan view of still another alternate form of ink fountain;

FIG. 20 is a section substantially on line 20—20 of FIG. 19 showing the fountain in a closed or start position prior to dispensing ink from the package;

FIG. 21 is a section similar to FIG. 20 showing the fountain in a first pressure applying position;

FIG. 22 is a section similar to FIG. 20 showing the fountain in a second pressure applying position;

FIG. 24 is a section similar to FIG. 20 showing the fountain in an open position to receive or permit removal of an ink package.

Figure 5:
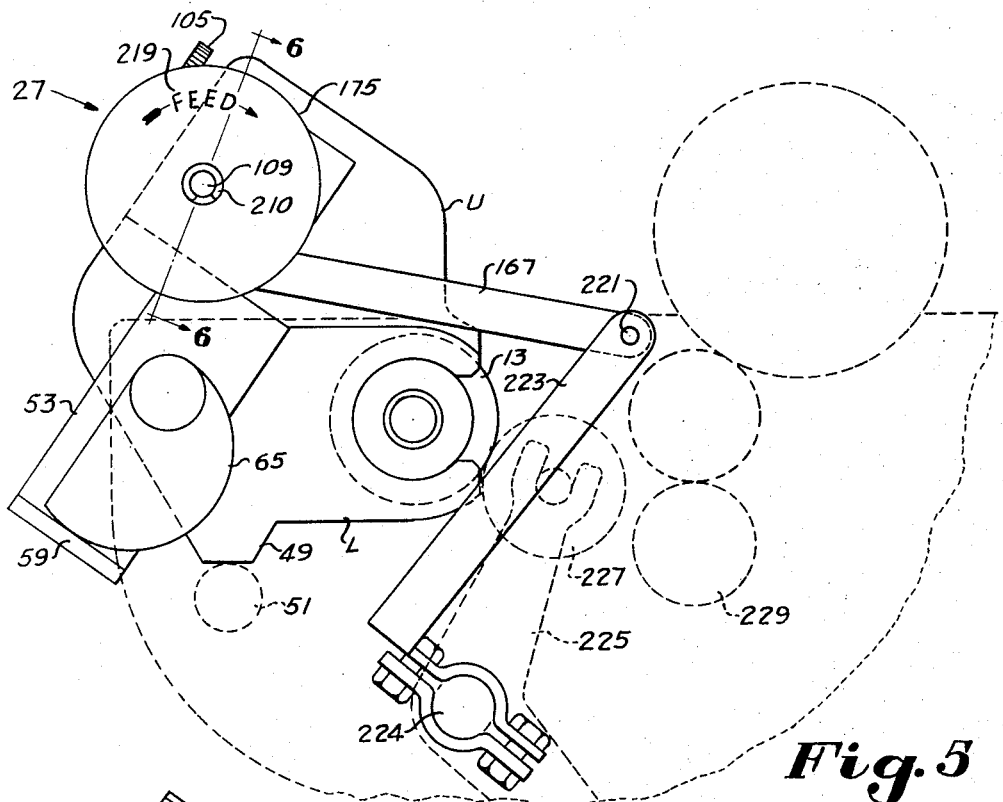
FIG. 5 is an end elevation of the fountain and associated machine parts showing a linkage arrangement to control the displacement of the ink from the package.

An ink fountain according to the present invention is indicated generally at 10 in FIG. 1 and comprises a casting or housing having an upper section U and a lower section L, a metering blade 15, a pressure plate 17, a cam 19, adjusting screws 21, a pressure actuating and release device 23, an operating handle 25 and an ink feed control unit 27. A fountain roller 13 is rotatably mounted between duplicator machine side plates 29 and 31 shown in dotted lines in FIG. 1.

The fountain is associated with the conventional rotary duplicating machine having a rotary printing cylinder parallel to and of substantially the same length as the fountain, and to which the fountain dispenses pasty ink through a train of parallel ink rolls in the customary manner.

The fountain is releasably mounted between the duplicator machine side plates adjacent the fountain roller, and to this end each side plate is provided with a bushing 33 which is affixed to and extends inwardly from the side plate. The inwardly extending portion of each bushing is provided with a pair of opposed, parallel flat surfaces 37 and 39 as shown in FIG. 10. The fountain roller 13, previously mentioned, is preferably rotatably supported by the bushings and to this end is provided with trunnions 41 and 41a which are received within the bushings 33, the latter trunnion extending through its bushing and being driven by a suitable rotary stepping mechanism (not shown) in a conventional manner.

With reference to FIG. 2, the lower section L of the fountain is provided at both ends with a keyhole opening having a circular diameter 43 corresponding to the diameter of bushing 33, and a rectangular opening defined by sides 45 and 46 corresponding to the dimension of the bushing between the flat sections 37 and 39. The fountain is placed in position between the side plates by sliding the sides 45 and 46 of the keyhole opening over the flat sections 37 and 39 of bushing 33 respectively, and pivoting the fountain in a counterclockwise direction to the position shown in FIG. 2. In this position the fountain is positively retained on the bushings and a projection 49 of lower section L rests on a tie bar 51, as shown in FIGS. 2 and 5, to restrict the pivotal downward movement of the fountain and to maintain it at the proper level. Removal of the fountain from the machine is effected by pivoting the fountain in a clockwise direction as viewed in FIG. 2, until the sides 45 and 46 are aligned with the flat sections 37 and 39 of bushing 33, and lifting upwardly on the fountain until thte keyhole opening is clear of the bushing. It will be recognized that this is one conventional arrangement for providing a readily demountable connection for attaching an ink fountain to a duplicator frame.

The upper and lower sections of the fountain, U and L respectively, are arranged to permit movement of section U toward and away from section L, i.e., section U is movable between an open and a closed position. This movement of section U is effected by manual actuation of the operating handle 25, and is required to allow an ink package P (see FIG. 4) to be placed into and removed from the ink fountain. The ink package is shown and described in my copending application Ser. No. 549,752, filed Apr. 20, 1966, which is a continuation in part of my copending application Ser. No. 381,975, filed July 13, 1964, (now abandoned), assigned to the common assignee hereof, and comprises generally a long, relatively flat flexible plastic sealed envelope containing ink and arranged with a tear strip which will open a slit at the lower edge of the package whenever the same is to be put to use. Preferably the package P also includes a longitudinally extending flap F$^1$ (FIG. 4) which will lie against the metering blade of the fountain and protect the same from ink contact, and a longitudinally extending flap F$^2$ by which the package can be grasped and held in the fountain.

It will be readily understood that when the tear strip at the lower edge of the package is pulled, the slit opened thereby in cooperation with the flap F$^1$ provides an elongate ink dispensing mouth whose margins rest in continuous intimate contact with the fountain roller 13 to guide ink from the interior of the package directly to the fountain roller surface in a uniform manner along its length.

The means provided for effecting the opening and closing of the fountain is best shown in FIGS. 1 and 2 and comprises a guide member 53, a compression spring 71 and a cam 65. These means are provided at both ends of the fountain. However, since they are the same, only the means at one end will be described herein. As shown in FIG. 2, the outside surface of the end wall of lower section L is provided with a milled slot 55. This slot is of a width and depth corresponding to the width and thickness respectively of guide member 53 and is adapted to receive one end of guide member 53 for sliding movement therewithin.

The outside surface of the end wall of the upper section U is also provided with a milled undercut as shown at 54 in FIG. 2, adapted to receive the other end of guide member 53 which is affixed therein. Guide member 53 is fastened to upper section U by means of a pair of screws as indicated at 57. The end of the guide member 53 positioned within slot 55 is provided with an elongate opening 61 and an outwardly turned flange 59. An operating shaft 63 (FIGS. 1 and 2) is rotatably journalled in the end walls of lower section L and projects outwardly through the elongate opening 61. Each end of shaft 63 is provided with a cam 65 which is securely affixed thereto in a position to engage flange 59, and one end of shaft 63 is provided with the operating handle 25.

The end walls of sections U and L are further provided with a pair of aligned blind bores 67 and 69 as shown in FIG. 2. Compression springs 71, having a support pin 70 therein, is positioned within the bores so that one end of the spring occupies bore 67 and the other bore 69. In this way, guide member 53 and upper section U are continually urged upwardly by spring 71.

In the operation of opening and closing the fountain, movement of the handle 25 in a clockwise direction from the position of FIG. 3 rotates cam 65 to the position shown in FIG. 2. It will be observed, with the fountain in the closed position of FIG. 3, the high part of cam 65 is engaged with flange 59, and in the open position of the fountain shown in FIG. 2, the low part of the cam is engaged with the flange. Accordingly, as the cam is rotated between these two positions, guide member 53 is urged upwardly by spring 71 as a result of cam 65 presenting a gradually decreasing diameter to flange 59 of guide member 53. The upward movement of member 53 and, of course, section U to which member 53 is fastened, is terminated when the bottom of elongate opening 61 engages shaft 63.

Counterclockwise movement of handle 25 from the position of FIG. 2 to the position of FIG. 3 is effective to close the fountain as a result of rotating cam 65 presenting a gradually increasing diameter to flange 59. During rotation of the cam, guide member 53 is urged downwardly against the bias action of spring 71 until such time as the upper end of elongate opening 61 engages shaft 63. In this position the high part of cam 65 is engaged with flange 59 and upper section U is in closed position as shown in FIG. 3.

It will be appreciated, since a guide member 53, cam 65 and spring 71 are provided at both ends of the fountain and, since the movement of the guide members is controlled within the milled slots 55, operation of the handle 25 provides parallel motion to the guide members resulting in smooth and positive action of the opening and closing operations of the fountain.

The fountain of the present invention is also provided with a pressure plate 17 for the purposes to be explained hereinafter. This plate is best shown in FIGS. 2 and 4 and is hinged to the under surface of upper section U as indicated at 73, and the lower section L of the fountain is provided with a pair of spaced apart recesses 79 to accommodate the pressure plate hinges when the fountain is in the closed position shown in FIG. 4.

Also as seen in FIG. 4, the pressure plate 17 is spring biased in an upward direction by a spring 81. This spring is attached at one end to a pin 83 extending inwardly from the inside end wall of upper section U and at the other end to a lug 85 formed at one end of the pressure plate 17. Spring 81 is required at only one end of the fountain. While the operation of the pressure plate will be described hereinafter, it will be apparent from the description thus far that the plate 17 is arranged to pivot about the hinges 73 and is continuously being urged upwardly by the spring 81.

The ink metering blade 15 and adjusting screws 21 of the fountain are of conventional construction and, therefore, only a brief description of their functions will be given herein. The blade 15 is mounted to the base of the lower section L by screws 87 (FIGS. 1 and 4) and slopes downwardly toward the fountain roller 13. The adjusting screws 21 are threaded and are positioned in closely spaced tapped holes provided along the entire length of the fountain. The forward end of each screw is provided with a rounded end 89 adapted to engage the underside of the blade 15. As shown in FIG. 4, rotation of the screw in one direction forces a portion of the blade toward the fountain roller and rotation of the screw in the opposite direction allows that portion of the blade to move away from the roller, to locally decrease or increase respectively the amount of ink being fed from the fountain to the roller. The plurality of adjusting screws provided permit adjustment of the blade in relation to the fountain roller at various positions along the length of the blade.

The cam 19 is shown in FIG. 4 and functions to exert a downward force on pressure plate 17 to effect displacement of the ink from package P. Cam 19 is substantially the same length as pressure plate 17 and has trunnions 90 which are rotatably journalled in bushings provided in the end walls of upper section U of the fountain. One of the trunnions of the cam, in the area inside the end wall of section U, is drivingly connected with a worm wheel sector 91 whose operation will be explained hereinbelow. The same trunnion 90 of cam 19 that is connected with sector 91 extends slightly beyond the outside surface of the end wall of section U. This extended end has mounted thereon a pointer 93 which moves with cam 19 and indicates approximately the amount of ink in the package P on a scale 94 as shown in FIGS. 2 and 3.

Figure 11:
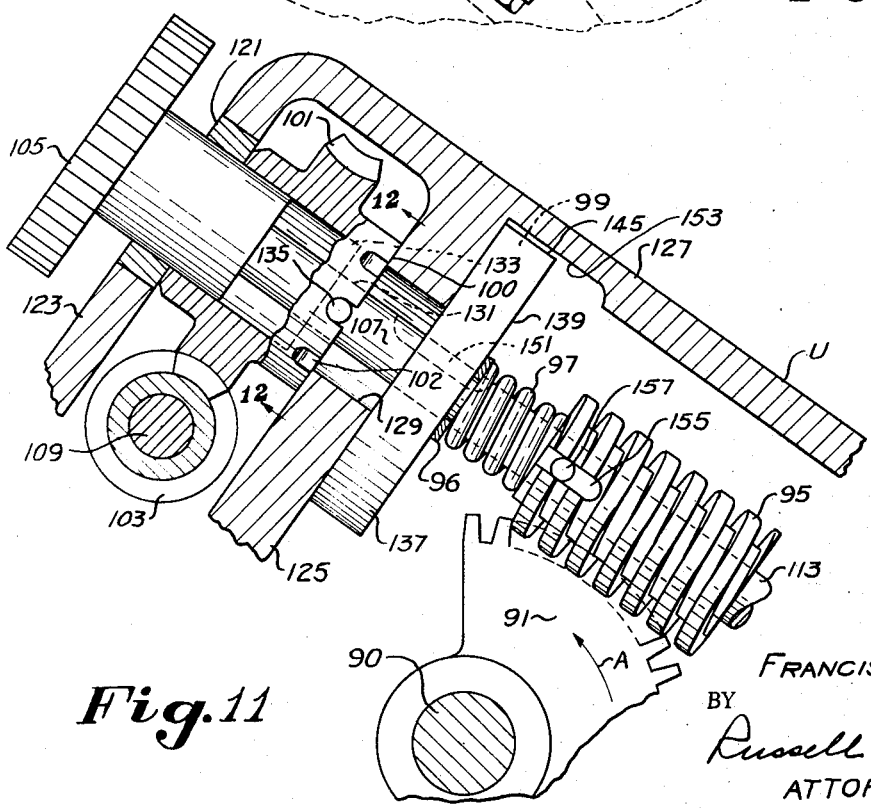
FIG. 11 is a detail section similar to the upper part of FIG. 4, but greatly enlarged.

The pressure actuating and release mechanism generally indicated at 23 in FIG. 1 is best shown in FIGS. 4, 6 and 11 and comprises a drive worm 103, a worm wheel 101, a plunger rod 107, a return spring 97, a cam actuating worm 95, a clock spring 99 and a release button 105.

With reference to FIG. 6, drive worm 103 is pinned on a shaft 109 and the shaft is rotatably journalled at one end in a bushing provided in a rib 111 of upper section U, and the mid-section of shaft 109 is journalled in a bushing provided in the end wall of section U. The shaft extends outwardly from the end wall and this extended section of the shaft is used to mount the ink feed control unit 27 which will be described hereinafter.

Plunger rod 107, shown in FIGS. 4 and 11, comprises an enlarged end section which forms the release button 105, and a turned down body section 113. The end of section 113 opposite button 105 is positioned for sliding movement within a shoulder bushing 115 which is pressed into an opening 117, slightly deeper than the length of the bushing, provided in a boss 119 on the inside surface of upper section U of the fountain. Button 105, on the other hand, is positioned for sliding movement in a bushing 121 pressed into a backwall 123 of the upper section U. Upper section U is further provided with a rib or clamping member 125 depending from the inside surface of the top wall 127, and rib 125 has a clearance opening 129 therein and a plurality of longitudinally extending teeth 126 provided in its bottom edge for a purpose to be explained below.

Worm wheel 101 is provided with a hole 131, FIG. 11, to permit sliding movement of plunger rod 107 therein, and a counterbore 133 to receive the release button 105 for sliding movement therein. Worm wheel 101 is positioned between backwall 123 and rib 125 and in mesh with drive worm 103.

The face of the worm wheel 101 which is against rib 125 is indicated at 100 in FIGS. 11 and 12a and comprises a plurality of spaced radial notches or grooves 102 as shown in FIGS. 12 and 12a. These grooves are positioned at 45° angles from each other thereby providing lands 104 between each of the grooves. A pin 135 is provided in the rods 107 and extends outwardly from both sides of the rod such that its extended ends lie within an aligned pair of grooves 102. The length of pin 135 is slightly shorter than the diameter of the clearance opening 129 in the rib 125 for reasons to be explained hereinafter.

Clock spring 99 is mounted within a cartridge 137, see FIG. 9. The cartridge comprises an end wall 139 (FIG. 4) and a side wall 141 (FIG. 9) of generally cylindrical configuration, thus forming a cup having a hollow or cavity 143 to receive the spring 99. A flat section 145 is also provided on the periphery of the cartridge for the purpose to be explained hereinafter. One end of clock spring 99 is provided with a curled end 147 located substantially at the center of the cartridge. The spring is loosely wound in a clockwise direction as viewed in FIG. 9, and the other end of the spring is fastened to the inside surface of the side wall 141 with a rivet 149. The cartridge assembly is positioned on plunger rod 107 with the cavity 143 facing rib 125 and the free edge of the side wall 141 of the cartridge against the rib 125. Plunger rod 107 is provided with a keyway 151 which receives the curled end 147 of spring 99 to afford a driving connection between the rod and the clock spring as shown in FIG. 9. The flat section 145 of the cartridge is positioned within a recess 153 provided in the inside surface of top wall 127 of the fountain to prevent rotation of the cartridge during operation of the clock spring.

Next positioned on plunger rod 107 is the compression return spring 97. This spring is positioned between the cam actuating worm 95 and a C washer 96 which forms a shoulder for the spring to exert an outward force which maintains the release button in an up or unoperated condition.

Cam actuating worm 95 is positioned on plunger rod 107 between spring 97 and bushing 115 and in mesh with worm sector 91. Worm 95 is provided with a pair of opposed slots 155 (see FIG. 11) extending inwardly from one end, only one slot being shown in the drawings. A pin 157 is provided in plunger rod 107 and extends outwardly from both sides of the rod. The extended ends of the pin drivingly engage slots 155 of worm 95 but are short enough not to interfere with the meshing engagement of worm 95 with sector 91.

The ink feed control unit indicated generally at 27 in FIG. 6 functions to control the amount of ink being fed from the package and will now be described in connection with the pressure actuating mechanism explained hereinabove. The feed control unit is mounted on shaft 109 and comprises an arm 161, a cam follower and pawl member 163, a ratchet wheel 165, a drive link 167, a safety clutch comprising a latch 169 and a drive element 171, a detent 173 and a cover 175.

Arm 161 is provided with a bearing hub 177 and is loosely mounted on shaft 109. One end of arm 161 has a pin 179 therein which serves as a pivotal connection with drive link 167. The other end of arm 161 is also provided with a pin 183 which provides a supporting pivot for the cam follower and pawl member 163. This member 163 has a cam follower end 162 and a pawl end 164. A spacer 185 is placed on the pin 183, between arm 161 and member 163, and provides a support for a torsion spring 187. Torsion spring 187 is placed around the spacer with one end hooked over an edge of member 163 and the other end hooked over an edge of arm 161. As viewed in FIG. 8, torsion spring 187 is effective to bias member 163 in a clockwise direction. Also cooperating with ratchet wheel 165 is holding pawl 188 which, in the form shown consists of a leaf spring secured to the end face of the upper section U.

Next positioned on shaft 109 is the ratchet wheel 165 which is loosely mounted on the shaft for rotation thereon, and the toothed peripheral edge of the ratchet is designed to be engaged by the pawl 164 of member 163.

Drive element 171 is pressed onto shaft 109 for rotation therewith and is positioned up against a hub 189 of the ratchet wheel. As shown in FIG. 7, drive element 171 of the safety clutch is provided with an angular cut-out 191 in its peripheral edge in the shape of a 90° V notch. The latch 169 of the clutch is pivotally mounted on a pin 193 provided in the ratchet wheel 165 and is retained by a C washer indicated at 195. Latch 169 has a projection 197 at one edge thereof which is shaped to engage the cut-out 191 of drive element 171. A spring 199 is attached at one end to a pin 201 provided in the ratchet wheel and to latch 169 at the other end. This spring biases the latch in a clockwise direction as viewed in FIG. 7 and tends to maintain projection 197 in engagement with the V notch in drive element 171 to effect a driving connection with ratchet 165 for the purpose to be explained hereinafter.

Cover 175 is best shown in FIGS. 6 and 8 and is shaped in the form of a hollow cup having an end surface 203 and a cylindrical side wall 205. The center of the cover is provided with a hub 207 for loosely mounting the cover on the shaft 109, and the cover and the shaft are held in place by a pair of C washers shown at 209 and 210 in FIG. 6. A camming surface 211 is provided on the inside surface of the side wall 205 and cooperates with the end 162 of member 163. The peripheral surface of the side wall is provided with a series of notches or steps 214 for cooperation with the detent 173. The cover 175 also has a cut-out 213 in its side wall to provide clearance for the drive link 167. Detent 173 is securely mounted on the end wall of the upper section U of the fountain. The detent is of resilient material and has a bent over section provided with a formed tooth 217 which is adapted to frictionally engage the notches 214 in the cover 175. As shown in FIG. 5, the outside surface of the end wall 203 of the cover may be provided with markings such as 219 to aid the operator in setting the control unit at a desired position for increasing or decreasing the feed of ink from the fountain.

Also as shown in FIG. 5, drive link 167 has its other end pivotally connected at 221 to one end of a lever 223, and the other end of lever 223 is drivingly connected to the shaft 224 of a ductor roller arm 225 which controls movement of the ductor roller between engagement with the fountain roller 13 and a distributor roller 229. It will be appreciated that the ductor roller mechanism is of conventional construction and functions to transfer ink from the fountain roller to the distributor roller each revolution of the duplicating machine. Since this mechanism is well known in the art a detailed description is not included herein.

The operation of the ink feed control unit 27 will now be described with reference to FIGS. 5–8 of the drawings. With the ductor roller 227 engaged with fountain roller 13, drive link 167 is positioned in its extreme leftward position as viewed in FIG. 5. In this position of the drive link the various parts of the control unit 27 are in the positions shown in FIG. 8. It will be observed that pawl 164 is disengaged from ratchet 165 and end 162 is in contact with the camming surface 211. However, as the ductor roller 227 is moved towards engagement with the distributor roller 229 lever 223 swings rightwardly as viewed in FIG. 5 thereby imparting movement to drive link 167 towards the right. As drive link 167 moves toward the right, arm 161 is pivoted in an anticlockwise direction as viewed in FIG. 8. Since arm 161 carries member 163, movement of the arm also causes member 163 to travel in an anticlockwise direction. Therefore, after member 163 has moved a short distance, end 162 rides down off the camming surface 211 thereby allowing member 163 to pivot about pin 183, thus engaging pawl 164 with the ratchet wheel 165.

As the drive link continues its rightward movement, since the pawl is now engaged with the ratchet, the ratchet is rotated in a counterclockwise direction as viewed in FIG. 8, and this rotation is imparted to the shaft 109 as a result of the ratchet wheel being drivingly engaged with drive element 171 on the shaft. As shaft 109 is rotated, drive worm 103 transmits rotation to plunger rod 107 through worm wheel 101 and this, of course, is effective to rotate worm 95, see FIGS. 4 and 11. The sector 91 is rotated in a counterclockwise direction by worm 95 and, since the sector is drivingly mounted on the trunnion 90 of cam 19 as mentioned earlier, cam 19 is also rotated in a counterclockwise direction. As the cam rotates it applies a downward force to pressure plate 17 and this force on the pressure plate applies a squeeze to the ink package P thereby displacing the ink from the package and onto the fountain roller. Of course, while cam 19 is rotated to apply a squeeze to the ink package, pointer 93 is also rotated a corresponding amount toward empty E position to give the operator a visual indication of the amount of ink remaining in the package.

On the next portion of the machine cycle, the ductor roller is moved away from the distributor roller and toward the fountain roller. As this movement of the ductor roller takes place, drive link 167 is moved toward the left as viewed in FIG. 5. This leftward movement of the drive link rotates arm 161 and member 163 in a clockwise direction as viewed in FIG. 8, whereby the pawl 164 first idles over the teeth of ratchet 165, and then the end 162 of member 163 rides up the camming surface 211 thereby pivoting member 163 and disengaging pawl 164 from the ratchet 165 for the remainder of the stroke.

It will be understood that each movement of the ductor roller between the fountain and distributor rollers is effective to rotate the ratchet wheel 165 a given amount which results in displacing ink from the package. Each time the ratchet wheel is stepped around, clockspring 99 on rod 107 is wound a corresponding amount. This winding of the spring continues until such time as it is desired to open the fountain, for replacement of the ink package for example. To open the fountain, all that is necessary is to depress release button 105 to cause rod 107 to move downwardly or toward the bottom of opening 117 provided in boss 119. Depression of button 105 is effective to disengage pin 135 from groove 102 by moving the pin into the opening 129 in rib 125, thereby releasing for rotation rod 107 and related parts. The rotation of the rod is effected by the unwinding of the clockspring which has its curled end 147 keyed to the rod and results in restoring all elements such as the cam 19, sector 91 and worm 95 to their starting positions. At this point, the fountain may be opened by moving handle 25 to the position shown in FIG. 2 and the ink package may be removed and replaced with a fresh package.

The amount the ratchet wheel 165 is stepped around at each stroke of lever 223 can be controlled, thereby controlling the amount of ink dispensed from the package. This is adjustable by setting pawl 164 to move the ratchet by one or more teeth, which setting is accomplished merely by rotating cover 175 to present a greater or lesser area of camming surface 211 to end 162 of member 163. With reference to FIG. 8, if cover 175 is rotated in a counterclockwise direction, camming surface 211 will be moved a corresponding distance thereby permitting end 162 to be engaged with the camming surface for a longer period. In this way, pawl 164 will be held out of engagement with the ratchet for a longer portion of its stroke and the ratchet will be rotated a smaller distance. Movement of cover 175 in a clockwise direction as viewed in FIG. 8, of course, decreases the period the end 162 is engaged with the camming surface 211 thereby rotating the ratchet wheel a greater amount.

It will be understood, depending on the setting of camming surface 211, ratchet 165 may be rotated by one or more ratchet teeth. The greater number of teeth the ratchet is moved each cycle of the machine, the greater amount of rotation will be imparted to cam 19 and the more ink will be displaced from the ink package. Conversely, the fewer number of teeth the ratchet is stepped around each revolution, the less ink will be dispensed from the package and to the fountain roller.

The notches 244 in the peripheral surface of cover 175 coacting with detent 173 aid the machine operator in determining the setting of the camming surface 211 and, therefore, the setting of the ink feed, and also prevent acidental movement of the cover once a setting has been made.

The overload relief clutch comprising latch 169 and drive element 171 is best shown in FIG. 7. As shown therein, latch 169 is biased in a clockwise direction about pivot pin 193 by spring 199 which maintains projection 197 of the latch in engagement with the notch 191 in drive element 171. Since drive element 171 is fixed on shaft 109, and since the latch 169 is mounted on the ratchet and is firmly engaged with drive element 171, the shaft 109 is carried around with the ratchet when the ratchet is rotated. Under normal loads, the clutch elements are not dislodged as the ratchet is rotated, i.e., projection 197 remains engaged with notch 191 to impart a drive to the shaft 109.

However, when the ink package is emptied and the cam 19 has been rotated to its extreme pressure applying position against the pressure plate 17, in order to prevent any further travel of the cam and possibly cause damage to various parts of the ink fountain, latch 169 is permitted to pivot in a counterclockwise direction as viewed in FIG. 7, thereby disengaging projection 197 from notch 191 and disconnecting driving engagement between drive element 171 and ratchet 165. In this way, projection 197 rides on the periphery of drive element 171 and no rotation is imparted to the shaft 109. As long as shaft 109 does not rotate, cam 19 is prevented from rotation and no further squeeze or pressure is applied to the pressure plate 17.

Until such time as the fountain mechanism is restored to its starting position, by depressing release button 105, projection 197 will continue to ride on the peripheral surface of drive element 171, and each time the projection passes the notch 191 it merely "clicks" as it drops into and is cammed out of the notch without effecting a driving connection between the latch 169 and the drive element 171.

A brief summary of the general over-all operation of the ink fountain will now be given. Rotation of operating handle 25 from the position shown in FIG. 3 is effective to open the fountain as shown in FIG. 2. With the fountain in open position, an ink package P is opened by slitting along its lower side and placed into the fountain with the open side adjacent fountain roller 13. The package lies on the blade 15 and the flap $F^2$ of the package extends rearwardly and upwardly toward the back wall of the lower section L of the fountain. Closing the fountain by rotating the handle 25 to the position shown in FIG. 3 lowers upper section U, thereby gripping the flap $F^2$ of the package between the teeth 126 and the blade 15, these parts being designed to come into contact first as the sections approach each other. The edge of flap $F^1$ of the package is then tucked between the fountain roller 13 and the metering blade 15 so that it will be drawn down into the FIG. 2 position as the fountain roll is driven in its normal anticlockwise direction.

With the duplicating machine in operation, ductor roller 227 (FIG. 5) actuates drive link 167 which, in turn, controls the movement of ratchet 165 shown in FIGS. 6–8. The movement of the ductor roller during each machine cycle, therefore, is effective to rotate the ratchet in a step-by-step manner. Depending on the setting of the camming surface 211, through manual positioning of the cover 175, the ratchet will be stepped around by one or more teeth. Each rotative movement of the ratchet imparts rotation to shaft 109, drive worm 103 mounted thereon and worm wheel 101 in mesh with the drive worm.

Worm wheel 101 is drivingly attached to plunger rod 107 by means of the notches 102 provided in the face of the wheel engaging a pin 135 in the plunger rod as shown in FIGS. 11, 12 and 12a.

As the plunger rod is rotated, clock spring 99 which is keyed to the rod is wound, and cam actuating worm 95 is rotated in a counterclockwise direction as viewed from the right in FIGS. 4 and 11. Worm 95 rotates sector 91 in the direction of arrow A and, since the sector is mounted on the trunnion 90 of cam 19, the cam also rotates with the sector. The cam is so designed that as it is rotated it presents a gradually increasing diameter to the pressure plate 17 thereby applying a squeeze to the ink package and effecting displacement of the ink from the package to the fountain roller. As the cam and sector are rotated, pointer 93 (FIGS. 2 and 3) is also moved away from full F position toward E empty position as a result of being fastened to the trunnion 90 of cam 19.

When the ink package is emptied and the machine is not shut off, cam 19 will continue to apply pressure to plate 17 until such time as the pressure exceeds the resistance offered by spring 199 maintaining latch 169 in engagement with drive element 171 as shown in FIG. 7. When the pressure of the cam overcomes the load of the spring, latch 169 is raised out of engagement with the drive element, thereby disconnecting the drive to shaft 109 and preventing any further rotation of the cam or squeezing of the ink package by pressure plate 17. Latch 169 will continue to revolve about drive element 171 without effecting a driving connection therebetween until the machine is shut off and the fountain is restored to its neutral or inoperative position.

To restore the fountain to its starting position, all that is required is manual depression of release button 105 shown in FIGS. 4 and 11. Depression of the button moves pin 135 out of engagement with notches 102, thereby disconnecting the drive between the worm wheel 101 and the rod 107. The rod is then free to rotate through the unwinding of clock spring 99. This rotation of the rod also rotates worm 95 and sector 91 resulting in rotating cam 19 upwardly or out of pressure engagement with plate 17 and rotating pointer 93 to its F position. On release of the button 105, all parts have been restored to their starting positions, plunger rod 107 is urged upwardly by spring 97 and pin 135 is again positioned in driving engagement with a pair of aligned grooves 102 in the face 100 of worm wheel 101.

Subsequently, the fountain is opened by turning handle 25 to the position shown in FIG. 2, the empty ink package is removed and the fountain is in condition for accepting a fresh ink package for another duplicating operation.

In the form shown the release button 105 is also so configured as to permit manual grasping and turning, so that if the fountain should be opened before an ink package is exhausted, the pressure plate setting can be restored after the fountain is reclosed by merely depressing the button 105 and turning it clockwise until the resistance of the package is detected.

An alternate form of the ink fountain of the present invention is shown in FIGS. 13–18 of the drawings and comprises a pair of side plates 250 and 252 (FIG. 13), a weight 254 (FIG. 14), a package clamping device and an anvil indicated generally at 256 and 258 respectively, and a pair of scraper blades 260 only one of which is shown in the drawings, the other being the same, except of opposite hand.

The side plates are held in spaced apart relation by a tie bar 262 which is fastened to the side plates at each of its ends by means of screws 264, only one screw being shown in FIG. 14 of the drawings. An operating shaft 270 is mounted between the side plates and is eccentrically secured at its ends, as by brazing, to collars 266 and 268 which are journalled in the side plates. The collars extend outwardly from the side plates and serves to mount a connecting link 272 at one end and an operating handle 274 and a connecting link 276 at the other end as will be further explained hereinafter.

The anvil 258 is best shown in FIG. 15 and comprises a head section 278, a sloping or inclined body section 280 and a pair of vertically depending legs 282 and 284 forming between them a U-shaped opening 286. Each end of the anvil is provided with a tapped and counterbored hole for mounting the anvil for pivotal movement between the side plates by means of a pair of shoulder screws 288, one of which is shown in FIG. 14 of the drawings. The depending legs 282 and 284 of the anvil straddle the operating shaft 270 so that the shaft is positioned within the U-shaped opening 286. An ink metering blade 289 is fastened to the upper surface of the sloping body section 280 by screws 290 as shown in FIG. 15. The anvil is further provided with a plurality of thumb screws 292 for adjusting the position of the metering blade in relation to the fountain roller as explained in connection with the earlier disclosed form of ink fountain.

The clamping device 256 includes a clamping bar 294 positioned directly above the anvil 258 and adapted to be moved into and out of engagement with the top surface of the head section 278 of the anvil. The clamping bar is guided in its up and down movement on a pair of guide pins 255 and 257 provided in the anvil as shown in FIGS. 13 and 18. The bar 294 is further provided with axially extending pins 296, 298 at each end for mounting the other ends of the connecting links 272 and 276 respectively. The connecting links are retained on the pins in any convenient manner.

Positioned within a groove running substantially the full length of the clamping bar 294, and in opposed relation to a recess 308 in the head section 278 of the anvil, is a gripper member 301. This member is retained within the groove by a pair of set screws 304 and 306, and is vertically adjustable by screws 300 and 302 as shown in FIGS. 13 and 15. When an ink package such as P in FIG. 14 is placed into the fountain, its rear flap F² is folded over the top of the head section 278 of the anvil and overlies the recess 308. Gripper member 301 is effective to grip and hold the package as a result of the member 301 entering the recess 308 when the clamping bar is lowered into engagement with the anvil as will be explained below.

Referring now to FIGS. 14 and 15 of the drawings, operating handle 274 is attached to collar 266, and the shaft 270, as mentioned earlier, is secured in an eccentric relation to the collar. A pin 310 is pressed into the outwardly facing end of collar 266 and extends therefrom. The pin 310 is also positioned eccentrically, both to the operating shaft 270 and the collar 266. One end of link 276 is loosely connected to pin 310 and is retained thereon in any suitable manner. The other end of shaft 270 secured to collar 268 is arranged in the same manner as described above except that it does not include an operating handle. In this regard, shaft 270 is brazed to collar 268 in an eccentric relation and a pin 312 is provided in the end of the collar to connect one end of link 272 thereto. This pin is also positioned eccentrically to both the shaft and the collar. Also, each of the collars 266 and 268 is preferably provided with means to hold the shaft assembly in position within the side plates, which may take the form of C washers 316 seen in FIG. 13.

From the foregoing, it will be understood that when the handle 274 is moved from its full line position, anticlockwise to the position indicated in dotted lines in FIG. 14, the eccentricity of the shaft to the collars is effective to move the shaft to the position shown in FIG. 15. As the shaft is rotated by the handle, anvil 258 is caused to pivot outwardly or away from the fountain roller by virtue of the shaft being engaged with the legs 282 and 284 of the anvil. This provides room for the ready removal and insertion of the flap F¹ of the ink package. At the same time, the eccentricity of the pins 310 and 312 is effective to raise the links 272 and 276 to the position shown in FIG. 15, thereby raising the clamping bar 294 on guide pins 255 and 257 out of gripping engagement with the rear of the ink package. When the handle is restored to its full line position of FIG. 14, the eccentric connections move the anvil and the links in reverse direction thereby lowering the clamping bar into clamping engagement against the anvil and pivoting the anvil toward the fountain roller to present the metering blade 289 closely adjacent the fountain roller.

To prevent inadvertent rotation of the collars 266 and 268, and movement of the anvil 258 as a result of machine vibration or the like, a spring loaded friction device is provided for each of the collars as shown at 320 and 322 in FIG. 13. Since these friction devices are both the same, only one will be described herein. As shown in FIG. 15, a drilled and partially threaded hole is provided in one edge of the side plate and runs through to the collar. Positioned within the hole and against the collar is a ball or block 324 which is urged against the collar by a spring 326. The spring and ball are retained within the hole by a set screw 328 which screws into the threaded portion of the hole. This friction device is effective to place a drag on the periphery of the collar to prevent accidental rotation thereof, and the amount of drag is easily adjusted by applying more or less compression to spring 326 with the screw 328. Detenting depressions in the collar surface for cooperating with the ball may be provided if desired.

The weight 254, previously mentioned, is best shown in FIG. 14 and serves to apply pressure to the ink package to dispense ink therefrom. Preferably, the weight is made of a solid piece of steel having a substantially square cross section and an extended bottom surface 330 which overlies the ink package. The weight is removably mounted on the fountain by a pair of arms 332 and 334, one arm being attached to each end of the weight by means of screws 336, one of which is shown in FIG. 14. Each arm is provided with a pin 338 which engages a notch 340 provided in a bracket 342 mounted by screws 344 to the top surface of clamping bar 294. There are two brackets 342, one for each arm, as shown in FIG. 13. It will be appreciated, this manner of mounting the weight 254 permits convenient positioning of the weight without the use of tools or critical adjustments.

The weight 254 may also be provided with a pair of upwardly projecting threaded studs 348 and 350 (FIGS. 13 and 14) to provide for the mounting of additional weights such as 352 shown in dotted lines in FIG. 14. Each weight 352 is provided with a pair of spaced apart slots (not shown in the drawings) for mounting on the studs, and the weights are held in place by nuts 354. Depending on the viscosity of the ink being used, and the ink coverage required on the copy sheet, a greater or lesser number of weights may be required and this method of varying the weight on the package has been found to be both expedient and effective. Also, since many duplicating machines are operated by female operators, the use of separate weights is a distinct advantage since the operator is not required to lift a great deal of weight at one time.

In those instances where additional weights are not required, and only weight 294 is utilized, nuts 354 may be run down on the studs to the position shown in full lines in FIG. 14.

The scraper blade is indicated generally at 260 and is shown in FIGS. 14, 15 and 16. One blade is provided at each end of the fountain roller, however, since they are both alike, except for being of opposite hand, only one blade will be described herein. The blade may be made of metal, Teflon or any suitable material and is preferably fabricated from a single piece of material or is of molded construction. The blade comprises an angled member 360, a depending leg 362 and a boss 364. The angled member is designed to ride on the surface of the roller and the leg is engaged with the end of the roller for the purposes to be explained below.

As mentioned earlier, during each machine cycle the fountain roller is engaged by the ductor roller to transfer ink thereto. In order to assure complete ink coverage of the roller, the ductor roller is usually made slightly longer than the fountain roller. In view of this, after a period of time the ink tends to build up at the ends of the ductor roller and transfer to the ends of the fountain roller. This accumulation, therefore, forces the ink over the peripheral edge of the fountain roller, down the end of the roller and causes ink contamination of the fountain and other related parts. The scraper blades of the present invention prevent the aforementioned difficulty by directing the ink that is forced over the ends of the fountain roller back onto the surface of the fountain roller, in a manner to be described below.

The bottom edge of the angled member 360 is helically shaped to conform to the periphery of the fountain roller and the lower edge is tapered as shown in FIG. 17 to form a scraping edge 368 which contacts the surface of the roller. The depending leg 362 has a surface 370, in engagement with the end of the roller, and a rounded camming surface 372. The surface 372 and the edge 368 are so designed that they merge smoothly at a point 374 as shown in FIGS. 14 and 16. If ink is forced over the end of the roller, it is moved by the motion of the roller toward the surface 372 as shown by arrow X in FIG. 15 surface 372 is effective to cam or direct the ink upwardly toward point 374 and against the edge 368 of the angled member 360 which, in turn, directs the ink back onto the working surface of the fountain roller. In this manner, the ink is continually being removed from the ends of the roller and restored to the ink train, thereby maintaining clean the ink fountain and adjacent parts.

The mounting of the scraper blades 260 on the fountain roller is accomplished by interconnecting the blades with a bar 376. The bar is provided with a pair of clearance notches 378 (FIG. 15) which are positioned over the bosses 364 and which approximately locate the scraper blades with respect to the ends of the fountain roller. The bar 376 is provided with a pair of elongate openings and is fastened to the blades by screws 380 which pass through these openings and are screwed into tapped holes provided in the bosses. The elongate openings permit lateral movement of the blades with respect to the bar 376, thereby affording an adjustment which permits placing the surface 370 of the depending leg 362 in close contact with the end of the fountain roller. The bar is also provided with a clearance hole 382 at each end for loosely receiving a pair of guide pins 384 projecting upwardly from the side plates of the fountain. This arrangement permits the removal of both scraper blades at the same time merely by lifting up the bar 376 and disengaging the holes 382 from the pins 384.

A spring arrangement is also included to provide the proper degree of pressure to the scraper blades against the fountain roller. As shown in FIG. 14, an arm 386 is pivotally attached to the end of weight 294 by a screw 390. The end of the arm opposite the pivot is provided with an enlarged section 392 which engages the top surface of the bar 376. The arm is urged downwardly to apply a force to the bar, by a spring 394 which is connected at one end to a pin 396 in the arm and at its other end to a pin 398 in the weight. It is to be understood, this spring arm arrangement is provided at both ends of the fountain to apply uniform pressure to the scraper blades.

The fountain is also provided with a pair of clamping screws 400 and 402 as shown in FIGS. 13 and 14 to hold the fountain firmly down against the tie rod 404 of the duplicating machine during manipulation of the weights 254 and 352.

The general operation of this modified ink fountain of the present invention will now be given. Starting with the handle 274 in the dotted line position of FIG. 14, clamping bar 294 is in open position and the anvil 258 has been pivoted away from the fountain roller to the position shown in FIG. 15. The ink package is opened at its lower side and placed into the fountain with the open side facing the fountain roller. The package lies on the metering blade and its rear flap $F^2$ is folded over the top surface of the head section 278 of the anvil. With the package in place, the operating handle is rotated to its full line position shown in FIG. 14. Rotation of the handle is effective, through the eccentric bushings, shaft and pins, and the connecting links, to lower the clamping bar into gripping engagement with the rear flap $F^2$ of the package between the anvil and the bar, and to pivot the anvil toward the fountain roller to place the metering blade into operative position with the roller with the protective flap $F^1$ therebetween.

The weight 254 is then placed on the package and is held in place by engaging the pins 338 in the notches 340 of the brackets 342. The spring arms 386 pivoted on the weight will engage the bar 376 and apply proper pressure to the scraper blades 260 against the rollers. At this point, the fountain is conditioned for operation.

If during operation of the machine it is determined a greater amount of ink is to be dispensed from the package, additional weights such as 352 shown in FIG. 14 may be positioned on the studs 348, 350 and locked in place by the nuts 354. It will be appreciated, the amount of ink to be dispensed from the package is dependent on the type of ink being used and the amount of ink coverage required on the copy. On the other hand, when the duplicating machine is shut off it is desirable to relieve the pressure on the ink package to prevent the ink from seeping out of the package and building up on the fountain roller. This, of course, is readily accomplished merely by removing the weight 254 and the additional weights 352 if they are present.

During operation of the fountain, the scraper blades are effective to transfer any ink that might go over the peripheral ends of the fountain roller, back to the working surface of the roller.

Still another alternate form of ink fountain of the present invention is shown in FIGS. 19–24 of the drawings. This ink fountain is substantially the same as the last described fountain insofar as the pivotal anvil 258, package clamping bar 294 and operating handle 274 are concerned. However, in place of the weight arrangement shown in the last described fountain, this modified ink fountain is provided with a spring arrangement to apply pressure to the ink package, and manually operative means to adjust the spring setting so as to apply a relatively constant pressure to the ink package to thereby dispense ink from the package and onto the fountain roller. Accordingly, the mechanism common to both of these fountains will not be further described in connection with the ink fountain now about to be described.

With reference to FIG. 20, clamping bar 294, such as disclosed in connection with the last described fountain, is provided with a pair of ears 425 securely attached to the top surface of the clamping bar and are each provided with a bore to support a tie bar 424 which passes therethrough. The ends of the tie bar are supported in a pair of bushings 432 and 434 rigidly mounted in a pair of side plates 420 and 422. The tie bar is retained in position within the side plates by C washers 436 and 438. A cam shaft 426, having a pair of cams 428 and 430 affixed thereto, is also mounted between the side plates 420 and 422 and is supported at its ends in a pair of bushings 440 and 442 rigidly mounted in the side plates. Cam shaft 426 is also held in place within the side plates by C washers 444 and 446. It will be appreciated, the tie bar 424 and the cam shaft 426 inter-connect the side plates to form a frame having pivotal movement about the axis of the tie bar as a single unit. The fixed ears 425 prevent motion of the side plates 420 and 422 towards each other along the tie bar and cam shaft.

A pressure applying plate 448 is pivotally mounted on tie bar 424 by means of hinges 450 as shown in FIG. 19, and fastened to the underside of plate 448 as with screws 452 is a spring plate 454 for a purpose to be explained below. A guide member 456 for the cam shaft is fastened centrally of the top surface of pressure plate 448 by a pair of screws 458. Guide 456 provides an upstanding ear 460 having an arcuate slot 462 therein (see FIG. 20) which serves as a center brace to guide and support cam shaft 426 against lateral deflection in use, and as a lift member for swinging the pressure plate 448 to open position when required. Movement of the cam shaft is effected by an operating handle 464 which is rigidly affixed to the cam shaft at a position closely adjacent the guide 456.

The mechanism thus far described comprises the upper section or pressure applying means of the ink fountain. Since the cam shaft 426 is connected to the side plates 420 and 422, and since it is confined by the slot 462 of the guide 456 which is fastened to the pressure plate 448, it will be seen that the side plates and the pressure plate are pivotally movable as a single unit about the tie bar 424, i.e., the whole upper section of the ink fountain is arranged for pivotal movement about the tie bar.

The lower section of the ink fountain is substantially the same as the last described fountain, except that the lower section of the fountain in this arrangement provides means which cooperate with the upper section to lock the upper section in closed position with respect to the lower section of the ink fountain. With reference to FIGS. 19, 20 and 24, a pair of locking cams 468 and 470 are rotatably mounted, one in each of the side plates 252 and 250 respectively. Each of the cams comprises a partial cylindrical portion which is slightly eccentric to the axis of rotation and which is also characterized by parallel flats 472, 474. Further, each of the locking cams 468 and 470 is provided with an operating lever (476 and 478 respectively), to permit the same to be rotated between the positions shown in FIGS. 20 and 24.

The side plates 420 and 422 of the upper section of the ink unit are each provided with a keyhole slot comprising sides 480, 482 and a circular opening 484 cut inwardly from the bottom edges of the side plates as shown in FIG. 24. Accordingly, when the upper section is pivoted from its open position shown in FIG. 24 to its closed position, the flats on the locking cams 468 and 470 and the sides 480 and 482 of the keyhole slot, permit the locking cams to enter the keyhole slots thereby positioning the locking cams within the circular openingss 484, 484. Thus, by rotating the levers 476 and 478 in a clockwise direction as viewed in FIG. 24, cams 468 and 470 are rotated to the position shown in FIG. 20 wherein the flats on the cams are transverse to the sides of the keyhole slot, and the peripheral surfaces of the cams engage the circular openings 484, 484. The eccentricity of the locking cams is such that turning them to the FIG. 20 position also cams side plates 420 and 422 downwardly to the left until the shoulders thereon (indicated at 485 in FIG. 24) seat against the upper edges of side plates 250, 252. This is effective to firmly lock the upper section to the bottom section of the ink fountain as shown in FIGS. 20–23. Obviously, to open the upper section of the fountain all that is required is to rotate the levers 476 and 478 in a counterclockwise direction as viewed in FIG. 20 to the position shown in FIG. 24. This rotation lines up the flats on the locking cams with the sides of the keyhole slot and permits the upper section to be disengaged from the locking cams and pivoted to the open position shown in FIG. 24.

Spaced identical cams 428 and 430 are provided to apply pressure to the pressure plate 448 which in turn applies a squeeze to the ink package to dispense ink therefrom.

As shown in FIGS. 20–23, each cam is provided with four active surfaces indicated 490, 492, 494 and 496, each providing a different displacement of the pressure applying plate 448.

Figure 23:
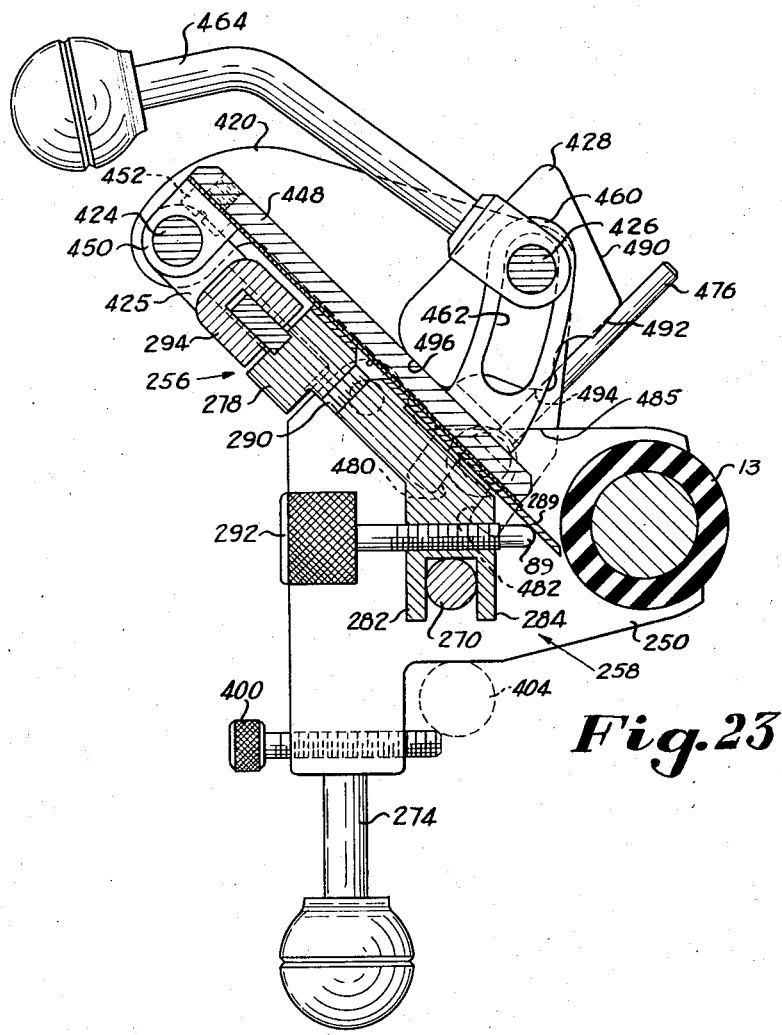
FIG. 23 is a section similar to FIG. 20 showing the fountain after the ink has been dispensed from the package but before the package is removed.

As shown in FIG. 20, the cam is in its neutral or home position wherein camming surface 490 is engaged with the pressure plate 448, and spring plate 454 would be deflected only slightly by the plate 448. The plate 454 is made of resilient material such as spring steel, and is designed to engage the ink package (not shown in these figures) across its entire length. If an ink package were in place in FIG. 20, it can be seen that the spring plate might be somewhat deflected thereby, and light pressure would be placed on the package, perhaps sufficient to equalize the distribution of ink between the package ends. To initiate feeding of ink from the package to the fountain roller, the cam is rotated by handle 464 in a counterclockwise direction as viewed in FIG. 20 to the position shown in FIG. 21. In this position, camming surface 492 is engaged with the plate 448 which has been pivoted downwardly by the cam to apply dispensing pressure to the ink package through the spring plate 454. The cam and related parts remain in this position until such time as sufficient ink has been drawn from the package to substantially relieve the dispensing pressure and it is required to increase the amount of ink being dispensed from the package. At such time the cam is again rotated, this time to engage camming surface 494 with the pressure plate as shown in FIG. 22. This, of course, additionally flattens spring plate 454 and applies additional squeeze to the ink package resulting in a restoration of the amount of ink fed from the package. The last position of the cam is shown in FIG. 23 wherein camming surface 496 is in pressure engagement with plate 448. As shown therein, spring plate 494 is virtually flattened out or straightened to apply maximum squeeze to the package and cause all of the ink content to be dispensed therefrom.

From the foregoing, it will be observed that the spring plate 454 is effective to apply an initial squeeze to the rear portion of the package to force the ink outwardly toward the fountain roller. As the pressure on the package is increased through rotation of the cams, the spring plate provides more and more squeeze to the package but always from the rear of the package toward the front. It has been found that this method of dispensing ink from a package is extremely effective, not only from the standpoint of being able to uniformly control the rate of ink discharge from the package, but also bcause the rolling pressure applied by the spring plate provides for emptying substantially all of the ink from the package thereby reducing to a minimum the amount of wasted ink remaining in the disposable package.

The general operation of this modified form of ink fountain of the present invention will now be given. Starting with the fountain in the position shown in FIG. 23, wherein the ink package has been emptied, the first operation is to release the cams 428 and 430 from pressure engagement with the pressure plate 448 by rotating handle 464 in a clockwise direction from the dotted line position to the full line position shown in FIG. 20. Next the levers 476 and 478 are moved from the position shown in FIG. 23 to the positions shown in FIG. 24. This movement of the levers unlocks the upper section of the fountain and permits raising of the same. Thereafter, the upper section is pivoted about tie bar 424 to the position shown in FIG. 24.

The next operation is to rotate the handle 274 to the position shown in FIG. 24 which, as explained in connection with the alternate form previously described, pivots the anvil 258 away from the fountain roller and raises or opens the clamping bar 294. In this open position of the fountain, the used ink package may be removed and replaced with a fresh package in the same manner described in connection with FIGS. 13–18 hereinabove.

With a fresh ink package in place, handle 274 is actuated to close the clamping bar on the ink package, following which the upper section of the ink unit is pivoted in a clockwise direction from the position shown in FIG. 24 to engage the keyhole slots in the side plates with the locking cams 468 and 470. In this position, the levers 476 and 478 are moved to the position shown in FIG. 20 to effect locking of the upper section to the lower section of the ink fountain. After the foregoing operations have been performed, the fountain and its related parts will assume the positions shown in FIG. 20. Subsequently, handle 464 is actuated to rotate the cams 428 and 430 to thereby apply varying degrees of squeeze to the ink package through the facilities of the pressure plate 448 and flexible member 454. On completion of a duplicating run, if some ink still remains in the package, the cams may be rotated back to the position shown in FIG. 20 to eliminate any pressure on the package and thereby prevent further dispensing of ink from the package to the fountain roller. When the machine is again placed into operation, the cams are again rotated into proper pressure applying position with the pressure plate to effect feeding of ink from the package.

It will be understood that the action of handle 464 and pressure cams 428 and 430 is to increase the squeezing action on the package in finite steps to make up for the ink depletion as it is used. The resilience of the spring plates, however, tends to smooth out these steps so that the squeezing action remains more nearly level than would appear from the four positions shown in FIGS. 20–23. In addition, if it is desired to further reduce the pressure variations during the emtying of an ink package, the cams 428 and 430 may be designed with more faces producing smaller increments of deflection of pressure plate 448.

It is to be understood that this alternate form of ink fountain, as well as that shown in FIGS. 1 to 12, may be provided with the scraper blades 260 for the fountain roller as disclosed in connection with the fountain described in FIGS. 13–18, to prevent the ink on the fountain roller from being forced over the ends of the roller thereby maintaining the fountain and related parts free from ink contamination. In both of these cases it may be convenient to provide direct tension spring urging between the bar 376 and the main side plates of the ink fountain instead of the spring-pressed lever 386 shown in FIG. 14.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. In combination, a rotary duplicating machine having:
   a rotary printing cylinder,
   an elongate flexible package of pasty ink having a dispensing mouth running the length thereof along one side, substantially equal in length to the printing cylinder,
   an ink fountain for dispensing pasty ink from said package, and
   a train of parallel ink rolls for receiving the ink from the fountain and transmitting it directly to the printing cylinder;
       said fountain including the following:
           (a) an elongate fountain roller substantially equal in length to the printing cylinder and package mouth, and means for rotatably supporting the same on a fixed axis adjacent and parallel to the ink train,
           (b) means for supporting the ink package adjacent the fountain roller in fixed relation thereto with the full length of its dispensing mouth in continual contact with the surface of the roller and extending substantially the length of the roller,
           (c) elongate package retaining means spaced from and parallel to said roller, including a clamping member movable between a package retaining position and a package releasing position for grasping and holding the package by an elongate margin of said package parallel to and on the opposite side from its dispensing mouth, said package retaining means being so located as to maintain the package in a position with its mouth in dispensing contact with the fountain roller;
           (d) means to effect movement of said clamping member; and
           (e) means to apply to an ink package held by said retaining means a progressive squeezing action simultaneously along the entire length of the package to dispense ink from the package mouth onto the surface of the fountain roller throughout substantially the entire length thereof and in substantially uniform amounts therealong.

2. Ink dispensing means as set forth in claim 1 in which the progressive squeezing means comprises a pressure member overlying the package, and which includes means designed to be connected to the duplicating machine to be driven thereby for gradually moving the pressure member from a starting position towards the package supporting means to progressively eject the ink from the package.

3. Ink dispensing means as set forth in claim 2 which further includes releasable clutch means as a part of the pressure member moving means for releasing the squeezing action of the pressure member when desired.

4. Ink dispensing means as set forth in claim 3 which further includes spring means for returning the pressure member to starting position whenever the clutch is released.

5. Ink dispensing means as set forth in claim 2 in which the pressure member moving means comprises adjusting means for varying the amount of motion of the pressure member resulting from each cycle of operation of the duplicator.

6. Ink dispensing means as set forth in claim 1 in which the progressive squeezing means comprises a weight resting against the upper surface of the package when the latter is in place on the package supporting means.

7. Ink dispensing means as set forth in claim 6 in which there is provided a handle and in which the package supporting means comprises an anvil mounted for pivotal movement toward and away from the fountain roller, and in which means is provided for so connecting said handle, anvil and clamping member that the anvil and clamping member are jointly movable upon actuation of the handle.

8. Ink dispensing means as set forth in claim 7 in which the handle has a pivotal motion about a center, in which the anvil comprises a pair of depending legs forming a channel therebetween, and in which the connecting means comprises an operating rod positioned within the channel and eccentrically connected to the handle, a link eccentrically attached at one end to the handle and pivotally connected at the other end to said clamping member, movement of the handle being effective to rotate the operating rod against one of the legs thereby imparting pivotal movement to said anvil, and simultaneously moving the clamping member through the link connecting said clamping member with the handle.

9. Ink dispensing means as set forth in claim 6 in which means are provided for holding weights in various combinations above and resting upon a package held by the package supporting means, whereby the squeezing force on the package can be adjusted.

10. Ink dispensing means as set forth in claim 1 in which said progressive squeezing means comprises a pressure member overlying the package and manually settable means for moving the pressure member step-by-step towards the upper surface of a package on the package supporting means.

11. Ink dispensing means as set forth in claim 10 in which there is provided a handle the package supporting means comprises an anvil mounted for pivotal movement toward and away from the fountain roller, and in which means is provided for so connecting said handle, anvil and clamping member that the anvil and clamping member are jointly movable upon actuation of the handle.

12. Ink dispensing means as set forth in claim 11 in which the handle has a pivotal motion about a center, in which the anvil comprises a pair of depending legs forming a channel therebetween, and in which the connecting means comprises an operating rod positioned within the channel and eccentrically connected to the handle, a link eccentrically attached at one end to the handle and pivotally connected at the other end to said clamping member, movement of the handle being effective to rotate the operating rod against one of the legs thereby imparting pivotal movement to said anvil, and simultaneously moving the clamping member through the link connecting said clamping bar with the handle.

13. Ink dispensing means as set forth in claim 1 in which there is further provided means coacting with the fountain roller to prevent migration of the ink to the end surfaces of the roller.

14. An ink dispensing means as set forth in claim 13 in which the means coacting with the fountain roller comprises a pair of spaced scraper members each provided with a camming surface in engagement with an end of the fountain roller and a blade in peripheral contact with the fountain roller, and means to maintain the scraper members in contact with the fountain roller.

15. An ink fountain for a rotary duplicating machine in which the ink is dispensed from an elongate flexible package having a dispensing mouth running the length thereof along one side, comprising:
a lower section having an elongate fountain roller rotatably associated therewith at least equal in length to the package mouth, said lower section including means to support the ink package adjacent the roller with the full length of its dispensing mouth in continual contact with the roller surface;
an upper section pivotally connected to said lower section for movement between an open position and a predetermined fixed closed position;
locking means to retain the upper section in said closed position;
a pressure member shaped to overlie substantially the full length of a package on said lower section, pivotally movable with said upper section to expose the package for removal when the upper section is opened or to overlie the ink package when the upper section is in closed position, and also pivotable relative to the upper section to squeeze the package; and
manually operable means carried by and reacting against the locked upper section to progressively move the pressure member toward the package and thereby dispense ink from the package mouth onto the fountain roller surface throughout substantially the entire length thereof.

16. An ink fountain as set forth in claim 15 wherein the pressure member comprises a spring plate on the surface of the upper section adjacent the package adapted for rolling pressure engagement with the package upon actuation of the pressure member moving means.

17. An ink fountain as set forth in claim 16 wherein the pressure member moving means comprises a cam mounted on the upper section with its periphery bearing on the pressure member and rotatable to any one of several different positions to effect progressive displacement of ink from the package.

18. An ink fountain as set forth in claim 17 which further includes means to prevent migration of ink to the end surfaces of the fountain roller comprising a pair of spaced scraper members each provided with a camming surface in engagement with an end of the fountain roller and a blade in peripheral contact with the fountain roller, and means to maintain the scraper members in contact with the fountain roller.

References Cited

UNITED STATES PATENTS

| | | | |
|---|---|---|---|
| 1,965,596 | 7/1934 | Kline | 101—366 |
| 2,143,886 | 1/1939 | Kline | 101—366 |
| 2,644,613 | 7/1953 | Pepin | 22—103 |
| 2,922,364 | 1/1960 | Nitchie et al. | 101—364 |
| 2,998,767 | 9/1961 | Vandercook et al. | 101—366 |
| 3,070,824 | 1/1963 | Martin | 15—571 X |
| 3,070,825 | 1/1963 | Martin | 15—571 X |
| 3,094,924 | 6/1963 | Stark | 101—210 |

FOREIGN PATENTS

| | | |
|---|---|---|
| 572,663 | 7/1945 | Great Britain. |
| 694,654 | 7/1953 | Great Britain. |
| 578,507 | 6/1958 | Italy. |

ROBERT E. PULFREY, *Primary Examiner.*

J. R. FISHER, *Assistant Examiner.*